United States Patent [19]
Blount et al.

[11] 3,941,992
[45] Mar. 2, 1976

[54] FLASH ARRAY HAVING SHIELDED SWITCHING CIRCUIT

[75] Inventors: Richard Blount, South Euclid; Paul T. Coté, Cleveland Heights; Edward C. Zukowski, Mentor, all of Ohio

[73] Assignee: General Electric Company, Schenectady, N.Y.

[22] Filed: Sept. 30, 1974

[21] Appl. No.: 510,362

[52] U.S. Cl. ............................... 240/1.3; 431/95 A
[51] Int. Cl.² ......................................... F21K 5/02
[58] Field of Search ........ 240/1.3; 174/68.5; 431/95

[56] References Cited
UNITED STATES PATENTS

| | | | |
|---|---|---|---|
| 2,502,291 | 3/1950 | Taylor | 174/68.5 |
| 3,042,740 | 7/1962 | Bosworth | 174/68.5 |
| 3,458,270 | 7/1969 | Ganser et al. | 431/95 |
| 3,608,451 | 9/1971 | Kelem | 240/1.3 X |
| 3,725,693 | 4/1973 | Anderson et al. | 240/1.3 |

*Primary Examiner*—Joseph F. Peters, Jr.
*Attorney, Agent, or Firm*—Norman C. Fulmer; Lawrence R. Kempton; Frank L. Neuhauser

[57] ABSTRACT

A multiple flash lamp array contains a sequentially switching lamp flashing circuit in the form of a printed circuit on a surface of a circuit board. A metal shield is provided over the other surface of the circuit board to reduce the possibility of accidental flashing of lamps by electrostatic voltage, which flashing tends to occur particularly when high voltage types of lamps are used in the array. Preferably, the shield is connected electrically to a lead-in wire of each lamp in the array, and also is connected electrically to a conductive reflector member positioned near the other side of the circuit board from the shield.

17 Claims, 4 Drawing Figures

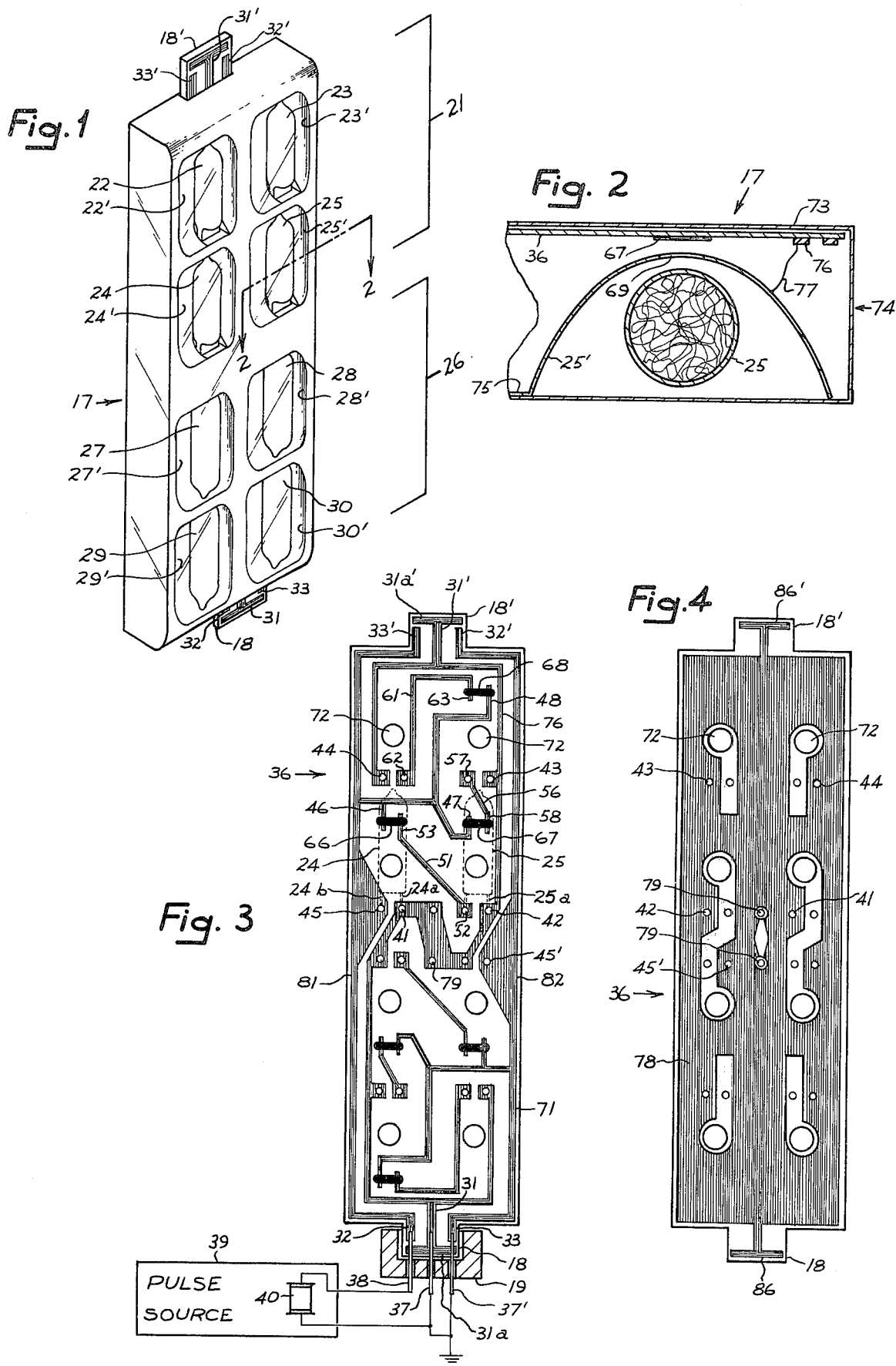

FLASH ARRAY HAVING SHIELDED SWITCHING CIRCUIT

CROSS-REFERENCES TO RELATED APPLICATIONS

Ser. No. 448,671, filed Mar. 6, 1974, Kurt H. Weber, "Multiple Flash Lamp Unit," assigned the same as this invention.

Ser. No. 485,459, filed July 3, 1974, Richard Blount, "Multiple Flash Lamp Unit," assigned the same as this invention.

Ser. No. 485,422, filed July 3, 1974, Paul T. Coté, "Multiple Flash Lamp Unit," assigned the same as this invention.

Ser. No. 485,460, filed July 3, 1974, Paul T. Coté, "Protective Terminal for Multiple Flash Lamp Unit," assigned the same as this invention.

Ser. No. 499,316, filed Aug. 21, 1974, Paul T. Coté, "Connector for Photoflash Array," assigned the same as this invention.

Ser. No. 508,334, filed Sept. 23, 1974, Richard Blount, "Photoflash Array Construction," assigned the same as this invention.

BACKGROUND OF THE INVENTION

The invention is in the field of multiple photoflash lamp units, such as planar arrays.

The above-referenced patent applications disclose multiple flash lamp units that can be connected to a camera in different orientations in each of which a different group of the flash lamps is relatively farther from the camera lens axis than are the other lamps of the unit. The lamps and electrical circuitry are arranged so that in any of the orientations of the unit with respect to the camera, only the group of lamps relatively farther from the lens axis can be flashed. The purpose of such an arrangement is to position the "active" group of flash lamps farther above the camera lens in order to reduce the possibility of a "red-eye" effect that causes the pupils of a person's eyes to appear red or pink in flash pictures taken when the flash lamp is close to the camera lens.

Each of the above-referenced multiple flash lamp arrays has, in a preferred embodiment, a circuit board having one or more integral plug-in connector tabs each provided with a plurality of electrical connection terminals in the form of conductive stripes printed on or otherwise attached to the connector tab. The various connector terminals are connected to individual lamps or to sequential firing circuitry carried on the circuit board and interconnected with lamps in the unit. Such flash units, and particularly if they employ high voltage types of flash lamps which are flashed by a high voltage pulse (1,000 or 2,000 volts, for example) of low energy, are prone to electrostatic firing of one or more lamps if a connection terminal is touched by or brought into close proximity to a person or object having an electrostatic charge. Such undesirable accidental flashing of lamps can also occur if the flash unit housing, which usually is made of a plastic material, acquires an electrostatic charge and a connector terminal is touched by or brought into close proximity to a charged person or object. The problem can also occur, and can be more severe, if both the plastic housing and the person or object near to or touching a connection terminal are electrostatically charged with relatively opposite polarities.

The first two of the above-referenced Coté patent applications disclose terminal circuit arrangements for reducing the likelihood of accidental flashing of lamps by electrostatic charge when the terminals are touched while handling the unit. This is accomplished by making one of the terminals longer or otherwise more readily touchable than the others, and by connecting this more touchable terminal electrically in the unit so as to have more stray capacitance to ground than the other terminals.

SUMMARY OF THE INVENTION

Objects of the invention are to provide an improved flash lamp array; to provide improved means for preventing accidental electrostatic flashing of lamps in such an array; and to provide such accidental flash prevention in a manner that is feasible and economical to manufacture.

The invention comprises, briefly and in a preferred embodiment, a multiple flash lamp array which comprises a lamp flashing circuit in the form of a printed circuit on a surface of a circuit board. A conductive shield is positioned face to face with the other surface of the circuit board to reduce the possibility of accidental flashing of lamps by electrostatic voltage, which flashing tends to occur particularly when high voltage low energy types of lamps are used in the array. Preferably, the shield is connected electrically to a lead-in wire of each lamp in the array, and also is connected electrically to a conductive reflector member positioned near the other side of the circuit board from the shield. A plurality of electrical terminals are provided on the array for connecting it to a socket of a camera or flash adapter, one of which terminals is shaped and arranged to be relatively more touchable than the others and is electrically connected to said shield, said lead-in wire of each lamp, and said reflector member. Preferably, the shield is plated or otherwise attached to the opposite surface of the circuit board from that having the circuitry thereon. By thus making one terminal more readily touchable and providing it with a relatively large stray capacitance to ground, an electrostatic charge applied to this terminal will be principally diverted through the larger capacitance to ground instead of passing through flash lamps in the array. Also, the shield on the one side and the conductive reflector on the other side of the circuit board shield the circuitry from electrostatic charges.

BRIEF DESCRIPTION OF THE DRAWING

FIG. 1 is a perspective view of a multiple flash lamp array in accordance with a preferred embodiment of the invention.

FIG. 2 is a cross-sectional view of a portion of FIG. 1 taken on the line 2—2 thereof.

FIG. 3 is a front view of a circuit board to which flash lamps are connected in the multiple lamp array, shown plugged into a socket.

FIG. 4 is a rear view of the circuit board of FIG. 3.

DESCRIPTION OF THE PREFERRED EMBODIMENT

A multiple flash lamp array 17, shown as being of the planar array type and containing a plurality of electrically fired flash lamps, is provided with a plug-in connector tab 18 at the lower side or end thereof, adapted to fit into a socket 19 (FIG. 3) of a camera or flash adapter. The lamp array 17 is provided with a second plug-in connector tab 18' at the top side or end thereof, whereby the array 17 is adapted to be attached to the socket 19 in either of two orientations, i.e., with either the tab 18 or the tab 18' plugged into the socket 19. The array 17 is provided with an upper group 21 of flash lamps 22, 23, 24, and 25, and a lower group 26 of flash lamps 27, 28, 29, and 30. Reflectors 22', etc., are disposed behind the respective flash lamps so that as each lamp is flashed its light is projected forwardly of the array 17. The relationship of each reflector to its associated lamp, and a suitable plastic housing and transparent front cover, may be as disclosed in the first above-referenced Blount patent application.

With the array 17 oriented and plugged into the socket 19 as shown in FIG. 3, only the upper four lamps of the array, which constitute the upper group 21, can be flashed, and the four lamps of the lower group 26 are inactive and will not flash. Thus, the above-described undesirable red-eye effect is reduced or eliminated, since the only lamps of the array that can flash are grouped relatively far from the socket 19 and hence from the axis of the camera's lens. The array 17 can be removed from the socket 19, either before or after all lamps of the upper group 21 have been flashed, and turned around, with the upper tab 18' now the lower tab which is inserted into the socket 19, whereupon the group 26 of lamps becomes the upper group, and its lamps are flashed, again reducing or eliminating the red-eye effect because the active lamps are relatively farthest from the socket 19 and hence from the axis of the camera's lens.

Electrical connector terminals are provided at the tabs 18 and 18', and if flash sequencing circuitry is included in the multiple flash unit, for instance as illustrated in FIG. 3, only two electrical terminals, which may be in the form of printed circuit stripes, need be provided on each tab for connecting the upper or active group of lamps to the socket 19. Thus, tab 18 is provided with a pair of electrical terminals 31 and 32, and the tab 18' is provided with a pair of terminals 31' and 32'. Each tab is provided with a third terminal 33 and 33', respectively, which functions in the camera to electrically short the circuitry of the inactive lower group of lamps, as will be described.

FIG. 3 shows a circuit board 36 for the embodiment of FIG. 1 which can be contained within the housing of the unit 17 behind the reflectors 22', etc., and which supports the flash lamps by their lead-in wires and provides for sequential firing of each group of lamps. The plug-in connector tabs 18 and 18' may be formed integrally with the circuit board 36 at opposite ends thereof, as shown. The top and bottom halves of the printed circuitry are reverse mirror images of each other.

The camera socket 19 for the flash unit 17 is provided with a pair of contacts 37 and 38 which respectively electrically engage the terminals 31 and 32 (or 31' and 32') of the flash unit when it is plugged into the socket 19. A third contact 37' is electrically connected to contact 37 and engages the third terminal 33 (or 33') of the circuit board.

A firing pulse source 39, which may be contained within a camera or flash adapter, is connected to the contacts 37 and 38 of the socket 19. The type of firing pulse produced by the source 39 and applied across the contacts 37 and 38 will of course depend on the type of lamps used in the flash unit 17. If low voltage filament types of flash lamps are employed in the unit 17, the firing pulse source 39 may be a battery or battery-capacitor discharge type, producing, in synchronization with opening of the camera shutter, a pulse of approximately 3 volts to 15 volts or more and of sufficient energy to fire a single flash lamp having a primer between its lead-in wires. An example of a low voltage flash lamp is disclosed in U.S. Pat. No. 3,506,385 to Kurt Weber and George Cressman, and an example of a low voltage flash sequencing circuit is disclosed in U.s. Pat. No. 3,532,931 to Paul Coté and John Harnden. If the flash lamps in the multiple flash unit 17 are of the so-called high voltage type, requiring a pulse of approximately 1,000 or 2,000 volts or more for example, the firing pulse source 39 may comprise a suitable battery-capacitor discharge and voltage step-up transformer type of circuit, or preferably may employ a compact piezoelectric element 40 arranged to be impacted or stressed in synchronization with opening of the camera shutter, so as to produce a firing pulse having a voltage of approximately 1,000 or 2,000 volts or more and of sufficient energy to fire a single flash lamp. An example of a high voltage flash lamp and a firing pulse source comprising a piezoelectric element synchronized with a camera shutter is described in U.S. Pat. Nos. 2,972,937 and 3,106,080 to C. G. Suits.

The center terminal 31 includes a portion 31a extending laterally across the tab between its end and the terminals 32 and 33, as is more fully disclosed in the above-referenced Coté patent application Ser. No. 485,460. The portion 31a functions to reduce the possibility of lamps being flashed by electrostatic charge when the tab 18 is grasped by a person or comes into contact with another object and also functions, when the tab 18 is being plugged into the socket 19, to temporarily short out and discharge any residual voltage of the firing pulse source 39. Similarly, the terminal 31' includes a lateral portion 31a'.

The circuit board 36 in FIG. 3 is shown in the orientation in which the connector tab 18 faces downwardly and is plugged into the socket 19, whereby the circuit board terminals 31, 32, and 33 respectively make electrical contact with the socket contacts 37, 38, and 37'. The circuit board terminal 31 is part of a continuous conductor run on the board, which is connected in common to one electrical lead wire (22a, 23a, 24a, etc.) of each of the eight flash lamps 22, 23, 24, etc., in the unit at points 41, 42, 43, 44, etc., by suitable means such as soldering, welding, or crimping. For the sake of clarity, only two flash lamps 24 and 25 are shown in FIG. 3, and in dashed lines. Suitable openings are provided through the reflectors at the bases of the lamps to permit the connections of the lead-in wires to the circuit board.

The circuit board terminal 32 is part of a conductor run that is connected to lead-in wire 24b of lamp 24 at point 45, and terminates at radiation switch terminals 46, 47, and 48 respectively positioned near lamps 24, 25, and 23. A circuit board conductor run 51 is connected to the remaining lead wire of flash lamp 25 at 52, and terminates at a radiation switch terminal 53 which is near to but spaced from radiation switch terminal 46. A circuit board conductor run 56 is connected to the remaining lead-in wire of flash lamp 23 at point 57, and terminates at a radiation switch terminal 58 which is near to but spaced from radiation switch terminal 47. Similarly, a circuit board conductor run 61 is connected to the remaining lead-in wire of flash lamp 22 at point 62, and terminates at a radiation switch terminal 63 which is near to but spaced from the radiation switch terminal 48.

Radiation switches 66, 67, and 68 are respectively positioned to be in contact with and bridge across the respective pairs of switch terminals 46–53, 47–58, and 48–63. The material for the radiation switches 66, 67, and 68 may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches 66, 67, and 68 is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches 66–68 is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

The terminal 33 on the plug-in tab 18 is connected, via a printed circuit run 71, to the connection point 45' for lamp 28, which is the first lamp to be flashed when the array is turned around so that terminals 31' and 32' are connected to the firing pulse source 39 via the socket 19. Since the socket contacts 37 and 37' are electrically shorted together, they electrically short together the tab terminals 31 and 33, also at the same time shorting terminals 31' and 32' of the inactive lower group of lamps, thus electrically shorting the input of the circuitry for the inactive group of lamps. Similarly, when the unit is turned around, the socket contacts 37 and 37' will electrically short the terminals 31' and 33' and also terminals 31 and 32, thus shorting the input of the then inactive lamp circuit. This shorting of the inactive lamp circuit prevents accidental flashing of an inactive lamp by stray capacitive coupling of a firing pulse, as is described in detail in the first above-referenced Blount patent application. Of course, this precaution is useful only when the inactive lamps have not yet been flashed, and is not necessary if they have already been flashed.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into the socket 16, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit of FIG. 3 functions as follows. Assuming that none of the four lamps in the upper half of the unit 17 have been flashed, upon occurrence of a first firing pulse from the source 39, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 66 to become a closed circuit between terminals 46 and 53 (or a low value of resistance), thereby connecting the circuit board terminal 32 electrically to the lead-in wire of the second lamp 25 at point 52. By the time this occurs, the firing pulse has diminished to a value insufficient to cause the second lamp 25 to flash. When the next firing pulse occurs, it is applied to the lead-in wires of the second lamp 25, via the now closed radiation switch 66, whereupon the second lamp 25 flashes, thereby causing radiation switch 67 to assume zero or low resistance, and the second lamp 25 now has an open circuit or high resistance between its lead-in wires. When the next firing pulse occurs, it is applied via now closed radiation switch 67 to the third lamp 23 via its lead-in wires which are connected to the printed circuit at points 43 and 57, thereby firing the lamp which becomes an open circuit, and the radiation from it causes the radiation switch 68 to become essentially a closed circuit across its terminals. Thus, the next firing pulse will be applied, via now closed radiation switch 68, to the lead-in wires of the fourth flash lamp 22 which are connected to the circuit at points 44 and 62, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around and the other connector tab 18' attached to the socket 19, the group of lamps that then become uppermost and relatively farthest away from the lens axis will be in an active circuit and will be flashed in the same manner as has been described.

Openings 72 may be provided through the circuit board 36 to permit radiation from a flashing lamp to change the color of a heat-sensitive plastic sheet material (not shown) positioned behind the circuit board and visible through a transparent back 73 of the housing 74, thus indicating at a glance which lamps have, and have not, been flashed, as is described in further detail in the second above-referenced Blount patent application.

The "T-bar" terminals 31 and 31', both being connected to a lead-in wire of each of the flash lamps in the unit, will have a relatively greater value of stray capacitance to ground than the other terminals, and when these more readily touchable terminals are touched by an electrostatically charged person or object, substantially all of the charge energy will be dissipated to ground through the relatively larger capacitance of the common connection circuit rather than passing through the primers of lamps and hence through the relatively smaller capacitance of the remaining circuitry to ground. If the charged person or object touched only the terminal 32 (or 33') or only the terminal 33 (or 32'), the dissipative flow would tend to pass through one or more of the lamp primers, creating a spurious electrostatic firing of the lamp or lamps. But since the common connector terminal (i.e., the terminal 31 or 31') is substantially always touched alone or simultaneously with one of the terminals 32, 33, 32' or 33', the electrostatic charge will pass to ground through the relatively larger capacitance of the common connection circuit without tending to flow through a lamp primer.

Simultaneous touching of the terminal 31 or 31' and one or both of the remaining terminals cannot cause electrostatic flashing because the same voltage is applied to both lead-in wires of the lamps. Usually, if the electrostatic charge is great enough to be likely to flash a lamp, contact will be in the form of a spark between the common terminal 31 or 31' and the electrostatically charged finger or object.

To increase the stray capacitance to ground of the common connection circuit, and therefore further reduce the likelihood of accidental electrostatic firing of lamps, a large-area shield member 75 is connected to the common connection circuit. An advantageous way of achieving this is to provide a one-piece multiple reflector unit, of substantially the same size as the flash unit 17, shaped to provide the individual reflectors 22', 23', etc., and made of metal or metallized plastic and connected electrically to the common connection circuit 76 by means such as a wire 77 (FIG. 2), as described in the first and second above-referenced Coté patent applications.

In accordance with the present invention, a metal shield 78 in the form of a film or foil is positioned over and in adjacent face-to-face relation with the back surface of the circuit board 36, as shown in FIG. 4, and is electrically connected to the common electrical circuit run 76 on the front of the board by means of metal eyelets 79 extending through openings in the board. The shield 78, the reflector 75 and the common connection circuit 76 thus are connected electrically in common and may be referred to collectively as the "common unit."

The shield 78 can be plated or printed or otherwise provided on the surface of the board 36. The shield 78 should be shaped and arranged to cover the back of the circuit board 36 at least over a substantial portion of the areas corresponding to where the non-common or "hot" circuit runs 81, 82 are located on the front of the board, the term "hot" being used in the electrical sense to denote circuit runs other than the common electrical circuit run 76. The shield 78 may cover substantially the entire back surface of the board, including the points 41, 42, 43, 44, etc., where a lead-in wire of each lamp is connected to the electrical common circuit run by means of eyelets through holes in the board, to further assure reliable electrical interconnections of the lead-in wires with the "common unit" described above.

The shield 78 achieves beneficial results of reducing the possibility of accidental lamp flashing in at least two ways. First, it shields the relatively "hot" circuit runs 81, 82, which are close to the back 73 of the array and separated therefrom only by the thickness of the circuit board 36 plus perhaps a small air space, and reduces the likelihood of these "hot" circuit runs from picking up a capacitively induced electrostatic voltage charge from the back 73 of the array housing, which voltage charge can be caused when the array is handled or contacts a charged object, especially if the housing is made of plastic. Secondly, the shield helps to reduce the possibility of accidental electrostatic flashing of the lamps when the terminal 31 or 31' is touched when handling the array, because it is connected to the common circuit run 76 and increases the stray capacitance to ground of the common electrical circuit in the same manner as described above in connection with the reflector shield member 75 which also is connected to the common circuit run. With the shield 78 the conductive reflector 75 and the common circuit run 76 forming a "common unit" and all being electrically common to the terminals 31 and 31', the improvement is enhanced since the possibility of spurious electrostatic flashing is reduced.

Preferably, the shield 78 is shaped to provide "T-bars" 86 and 86' extending laterally across the tabs 18 and 18', respectively, near the ends thereof, to increase the likelihood of an electrostatic charge on the electrically "common unit" (and particularly on the shield 78) discharging and being dissipated to ground due to spark discharge between the shield extensions 86, 86' and another adjacent object. This purpose could be achieved by covering the entire back surfaces of the tabs 18, 18' with shield material, but it might cause a tendency for electrical leakage or discharge to occur around the side edges of the tabs 18, 18' between the shield material and the "hot" connector terminals 32, 33, 32', and 33'. The "T-bar" shield configurations 86 and 86', which may coincide with and be directly behind the "T-bar" connector terminals 31a and 31a' at the front of the tabs, achieves the desired result and avoids the just-described possibility of undesired leakage discharge.

It has been found that the invention achieves its objective of reducing the likelihood of accidental electrostatic flashing of lamps in a multiple lamp flash unit, and achieves it in a manner that is feasible and economical to manufacture.

While preferred embodiments of the invention have been shown and described, various other embodiments and modifications thereof will become apparent to persons skilled in the art, and will fall within the scope of the invention as defined in the following claims.

What we claim as new and desire to secure by Letters Patent of the United States is:

1. A multiple flash lamp array comprising a plurality of flash lamps of the electrically fired type, a circuit board having circuitry on one side thereof for sequentially firing said lamps, and means for electrically connecting said lamps to said circuitry, wherein the improvement in said array comprises an electrically conductive and substantially planar shield forming part of said array and located in substantially adjacent face-to-face relation with at least part of the opposite side of said circuit board to reduce the likelihood of said lamps being fired by electrostatic charges applied to said array.

2. An array as claimed in claim 1, in which said circuitry is provided with at least two connector terminals which are arranged on said circuit board so as to render it difficult for a person to touch one terminal without also touching the other terminal, and means electrically connecting said other terminal to said shield.

3. An array as claimed in claim 1, in which said circuitry includes a common circuit run connected in common to a lead-in wire of each of at least some of said plurality of said lamps, and means electrically connecting said common circuit run to said shield.

4. An array as claimed in claim 3, in which said circuitry includes "hot" circuit runs, and in which said shield is shaped and positioned to coincide with at least a substantial portion of said "hot" runs.

5. An array as claimed in claim 4, in which said shield is shaped and arranged to cover substantially the entire area of said other side of the circuit board.

6. An array as claimed in claim 3, in which said means electrically connecting the common circuit run to the shield comprises at least one electrically conductive member passing through the circuit board and contacting said common circuit run and said shield.

7. An array as claimed in claim 6, in which said lead-in wires are connected to said common circuit run at various points thereon, and electrically conductive members passing through the circuit board at said points, respectively, and contacting said common circuit run and said shield.

8. An array as claimed in claim 3, in which said circuitry is provided with at least two connector terminals which are arranged on said circuit board so as to render it difficult for a person to touch one terminal without also touching the other terminal, said other terminal forming a terminal for said common circuit run and being connected to said shield by way of said common circuit run.

9. An array as claimed in claim 8, including an electrically conductive reflector member for said lamps, and means electrically connecting said reflector member to said other terminal.

10. An array as claimed in claim 9, including at least one connector tab integral with said circuit board, said connector terminals being carried on the side of said tab that coincides with said one side of the board, said shield being shaped and arranged to extend onto the other side of said tab.

11. An array as claimed in claim 10, in which said shield is shaped and arranged to form a "T-bar" extending laterally across said tab at the end thereof.

12. An array as claimed in claim 8, including at least one connector tab integral with said circuit board, said connector terminals being carried on the side of said tab that coincides with said one side of the board, said shield being shaped and arranged to extend onto the other side of said tab.

13. An array as claimed in claim 12, in which said shield is shaped and arranged to form a "T-bar" extending laterally across said tab at the end thereof.

14. A multiple flash lamp array comprising a circuit board, a plurality of flash lamps of the electrically fired type and each having first and second lead-in conductors, first and second circuit runs on one side of said circuit board, means for electrically connecting said first circuit run in common to the first lead-in conductors of all of said lamps and for electrically connecting said second circuit run to the second lead-in conductor of each of a lesser number of such lamps whereby said first circuit run has larger stray capacitance to ground than said second circuit run, and an electrically conductive and substantially planar shield located in substantially adjacent face-to-face relation with at least part of the opposite side of said circuit board, and means for electrically connecting said shield to said first circuit run thereby to increase further the stray capacitance to ground of said first circuit run and to reduce the likelihood of said lamps being fired by electrostatic charges applied to said array.

15. A multiple flash array as claimed in claim 14, including an electrically conductive reflector member positioned adjacent said one side of said circuit board and defining reflector means for said lamps, and means for electrically connecting said reflector member to said first circuit run thereby to increase even further the stray capacitance to ground of said first circuit run.

16. A multiple flash array as claimed in claim 14, in which said shield coincides with at least a substantial portion of said second circuit run.

17. A multiple flash array as claimed in claim 14, in which said first and second circuit runs respectively include first and second connector terminals, said terminals being arranged on said circuit board so as to render it difficult for a person to touch said second terminal without also touching said first terminal, said first terminal being connected to said shield by way of said first circuit run.

* * * * *